United States Patent

Ghaem et al.

[11] Patent Number: 5,172,321
[45] Date of Patent: Dec. 15, 1992

[54] VEHICLE ROUTE PLANNING SYSTEM

[75] Inventors: Sanjar Ghaem, Palatine; Allan M. Kirson, Highland Park; Randolph M. Doi, Burr Ridge, all of Ill.

[73] Assignee: Motorola, Inc., Schaumburg, Ill.

[21] Appl. No.: 625,188

[22] Filed: Dec. 10, 1990

[51] Int. Cl.[5] .............................................. G06F 15/50
[52] U.S. Cl. ..................................... 364/444; 340/995
[58] Field of Search ............... 364/443, 449, 444, 436; 340/990, 995

[56]  References Cited

U.S. PATENT DOCUMENTS

| | | | |
|---|---|---|---|
| 3,845,289 | 12/1990 | French | 364/436 |
| 4,511,973 | 4/1985 | Miura et al. | 364/449 |
| 4,570,227 | 2/1986 | Tachi et al. | 364/444 |
| 4,635,202 | 1/1987 | Tsujii et al. | 364/449 |
| 4,642,775 | 2/1987 | Cline et al. | 364/443 |
| 4,796,189 | 1/1989 | Nakayama et al. | 364/449 |
| 4,804,937 | 2/1989 | Barbiaux et al. | 364/424.01 |
| 4,827,419 | 5/1989 | Selby, III | 364/443 |
| 4,926,336 | 5/1990 | Yamada | 364/444 |
| 4,954,958 | 9/1990 | Savage et al. | 364/444 |
| 4,964,837 | 2/1989 | Collier | 369/31 |

OTHER PUBLICATIONS

*Transportation for the Future,* "Automobile Navigation Technology: Where is it Going?" by Robert L. French, May 24-25, 1988.

CRN0007 U.S. Patent Application and Drawings Ser. No. 07/581,495 filed Sep. 7, 1990.

"Fighter Pilots Take Laptops on Board", Design News p. 34, Aug. 20, 1990.

*Primary Examiner*—Thomas G. Black
*Attorney, Agent, or Firm*—Phillip H. Melamed

[57]  ABSTRACT

A vehicle route planning system (10) has an in-vehicle route planning computer (12) which receives trip data, including at least one destination. Trip data is provided to the computer either by a wireless communication link between a remotely located radio transmitter (44) and an antenna (20) on the vehicle (11) or by a remotely located media writer device (46) writing the trip information on a removable storage media device (30) which is then provided to an in-vehicle media reader device (31). In this manner a vehicle operator may enter trip data into a remotely located apparatus (at 40) which translates this trip data into electrical signals that are then subsequently coupled to the in-vehicle route planning computer (12) which then uses this data for calculating at least one desired route for the vehicle to the specified destination via fixed road paths. Preferably the route planning system (10) is part of a vehicle navigation system (10). Preferably the system (10) utilizes radio receiver apparatus (20, 21) for transmitting the trip data to the in-vehicle route planning computer (12) wherein some of this radio receiver apparatus (20, 21) is also utilized to couple dynamic route traffic information, other than information specified by the vehicle operator, to the in-vehicle route planning computer (12).

20 Claims, 2 Drawing Sheets

VEHICLE ROUTE PLANNING SYSTEM

FIELD OF THE INVENTION

The present invention generally relates to the field of vehicle route planning systems and, in particular, to such route planning systems which calculate a desired route to a destination via fixed road paths.

BACKGROUND OF THE INVENTION

Many vehicle route planning systems are known in which a vehicle operator specifies a desired destination and directly inputs this data into an in-vehicle route planning computer or microprocessor. The computer then calculates a desired route to the specified destination via fixed road paths wherein these road paths are defined by detailed map data provided to the computer by some suitable means such as a compact disk (CD) reader. Such route planning systems are used in vehicle navigation systems in which detailed driving instructions are provided to the vehicle operator so as to guide him along the desired route to his destination by means of audible instructions and/or visual information displays.

Route planning and navigation systems such as those discussed above are very well known, and detailed route planning software is provided in the in-vehicle route planning computer used in the system. Also, detailed road map data is provided to the in-vehicle route planning computer. In such systems, the vehicle operator plans a trip by entering appropriate trip data, including desired destination data, after he enters the vehicle and turns on the route planning system. However, many times a vehicle operator would prefer to plan a trip prior to his entering into the vehicle. It would be much more convenient for the vehicle operator if he could plan his trip while he was in his home, office or hotel room. In that way, the vehicle operator would typically have additional information available to him concerning the trip and the trip planning would not necessarily have to take place in the confined area of a vehicle. It is possible to duplicate all of the in-vehicle route planning software and hardware and provide it in a remote location such that all of the trip and route planning might take place either via the in-vehicle computer or a duplicate remote route planning computer. However, obviously this is not an efficient way to implement route planning since it would require essentially duplicating the entire in-vehicle route planning system at a remote location, and this would double the cost of the route planning system. Providing a route planning computer remote from the vehicle is possible, but clearly many times the vehicle operator needs to calculate routes after he is in the vehicle and therefore he requires in-vehicle route calculation capability. The present invention implements an improved way of planning a trip and then utilizing an in-vehicle route planning system to calculate a desired route to a specified destination.

OBJECTS OF THE INVENTION

An object of the present invention is to provide an improved vehicle route planning system in which trip data, including data defining at least one desired destination, is specified external to the vehicle and subsequently this trip data is provided to an in-vehicle route planning computer for utilization in calculating a desired route to a specified destination via fixed road paths.

BRIEF DESCRIPTION OF THE DRAWINGS

For a better understanding of the present invention, reference should be made to the drawings in which.

DESCRIPTION OF THE PRFERRED EMBODIMENTS

Figure 1:
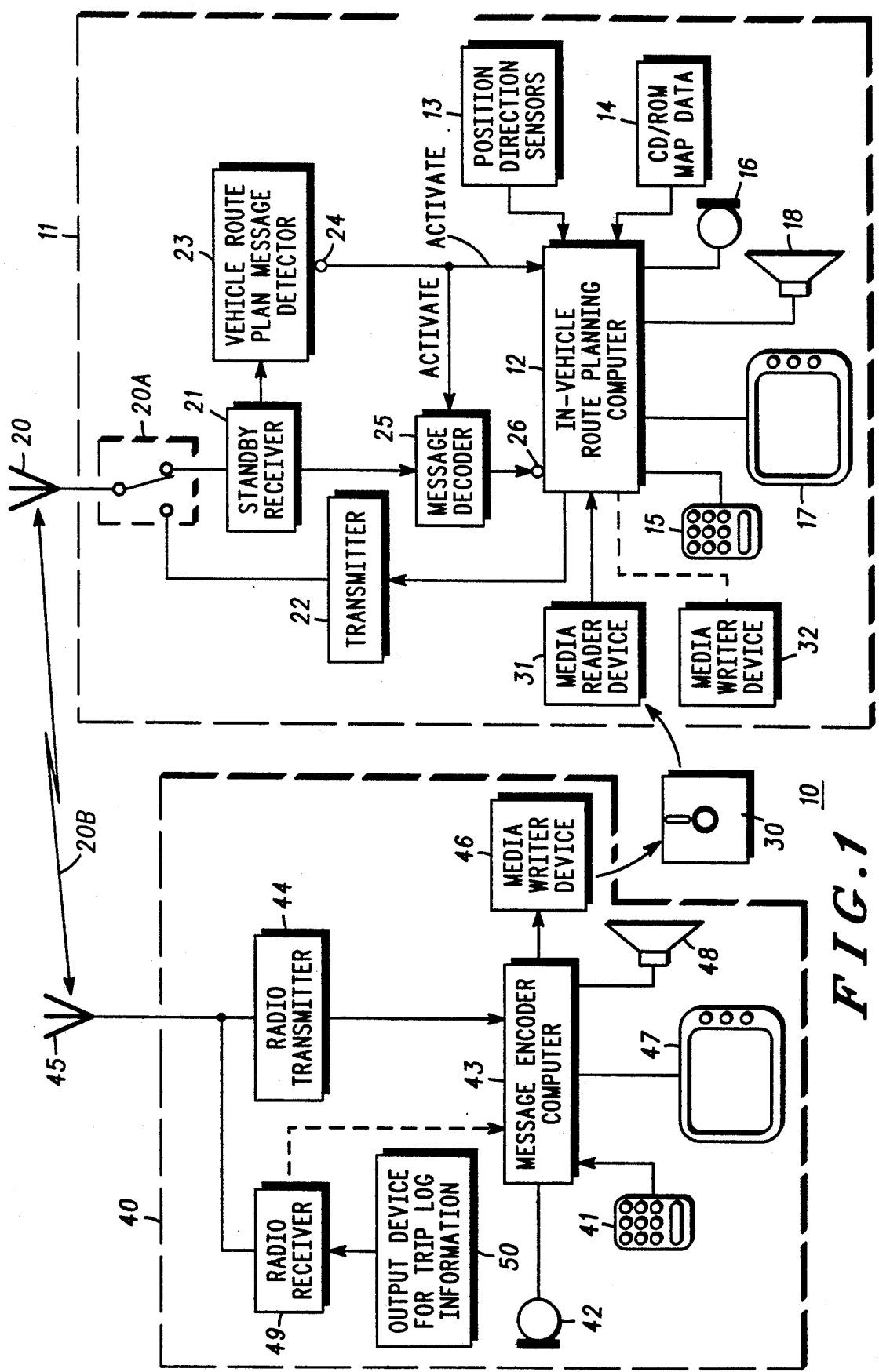
FIG. 1 is a schematic block diagram of a vehicle route planning and navigation system constructed in accordance with the present invention.

Referring now to FIG. 1, a vehicle route planning and navigation system 10 is illustrated which plans desired routes for a vehicle 11. The vehicle 11 is illustrated in dashed outline in FIG. 1. All components in FIG. 1 located within the dashed vehicle outline 11 are contained in or mounted on the vehicle 11. These components include an in-vehicle route planning and navigation computer 12 which receives navigation input data from a plurality of position and direction sensors 13. Detailed map data is provided to the computer 12 by a CD reader or ROM map data device 14 which essentially specifies the fixed road paths that are available for vehicle travel The route planning computer 12 also receives control inputs from a keyboard 15 and a microphone 16. The microphone 16 is provided so that the route planning computer 12 can, with the inclusion of voice recognition circuitry, respond to audible vehicle operator commands rather than just actuation of the keys of the keyboard 15 The route planning computer 12 provides both an output to a CRT visual display device 17 and an output to an audible speaker 18. In this manner, the route planning computer 12, display device 17 and speaker 18 will preferably function as a vehicle navigation system providing the vehicle operator with step by step visual and audible instructions with regard to navigating the vehicle to a desired destination along an optimum route which has been selected by the route planning computer 12.

In typical prior route planning systems, all of the components 12 through 18 have been provided in a vehicle. The vehicle operator, while in the vehicle, specifies his desired destination along with any route preferences he may have such as avoiding or including specific roadways or types of roadways such as expressways or roadways which have at least a minimum height clearance for his vehicle. In prior systems, only the in-vehicle input devices 15 and 16 were utilized by the vehicle operator to specify his desired destination. This therefore required the vehicle operator to begin planning his trip after he entered the vehicle and turned-on his route planning computer However, many times it would have been much more convenient for the vehicle operator to specify his desired destination and other trip parameters in the convenience of his home or office before he entered the vehicle, and the present vehicle route planning and navigation system 10 provides the vehicle operator with this advantage.

The route planning system 10 includes an antenna 20 which is selectively coupled to either a standby radio receiver 21 or a transmitter circuit 22 by a switch 20A. The standby radio receiver 21 is connected to a vehicle route plan message detector circuit 23. In the event that this circuit detects the reception of a route planning message by the standby receiver 21, the detector 23 will provide an activate signal at a terminal 24 that is coupled both to the in-vehicle route planning computer 12 and a message decoder 25 that also receives message information from the standby receiver 21. An output of the message decoder 25 is provided to an input terminal 26 of the in-vehicle route planning computer.

Essentially, the standby receiver 21 is a very low power radio receiver which is effectively on all of the time. The detector 23 determines if a vehicle route plan message has been received If so, it essentially wakes up, supplies operative power to, the in-vehicle route planning computer 12 and the message decoder 25 so that these components will now respond to the received message. The message decoder 25, when activated, essentially just decodes the radio data which has been received and has already been identified as comprising route planning messages This data is then provided to the terminal 26 and the route planning computer 12 responds to this data since it has been activated by the signal provided at the terminal 24. Power for the message decoder 25 is also provided by the activating signal at the terminal 24 When a vehicle operator enters the vehicle and turns on the system 10 power is then continuously supplied to the decoder 25 and computer 12 until the operator turns the system 10 off.

In essence, if trip data including a desired destination is transmitted to the vehicle 11 and received by the antenna 20, this will be detected by the message detector 23. The in-vehicle route planning computer 12 will then receive such data via the message decoder 25 and store this data for later route planning when such route planning is subsequently requested by the operator of the vehicle. Thus, for the system 10 trip data may be transmitted via an RF wireless radio link 20B to the in-vehicle computer 12 and stored for subsequent use when the vehicle operator enters the vehicle and instructs the in-vehicle computer 12 to calculate a desired route to the previously specified destination. This eliminates the need for the vehicle operator entering destination data and other trip preference data after he enters the vehicle since he has already transmitted such information to the route planning computer 12. This trip data was transmitted to the computer 12 via the trip data providing apparatus which includes the antenna 20, the standby receiver 21, the message detector 23 and the message decoder 25. Alternatively, the vehicle operator may choose to just insert into the in-vehicle route planning computer 12 trip data which has been stored as magnetic/electrical signals on a removeable media carrier such as a floppy disk or tape. In that situation, a floppy disk 30, or a tape containing the same information, would be inserted into a media reader device 31 which is coupled to and provides data to the in-vehicle route planning computer 12. Again, in this situation the vehicle operator has entered trip data, which data was specified external to the vehicle 11, into the in-vehicle route planning computer 12. Thus there is no need for the vehicle operator to re-key such information into the computer 12 via the keyboard 15 or re-enunciate such data via the microphone 16.

Within the vehicle 11, an optional media writer device 32 is shown. If the vehicle operator desires an output log, for example, of all trips made by the vehicle, then by instructing the route planning computer 12 this computer may provide such data read out to the media writer device 32 which would then store this data on a magnetic floppy disk or tape or some other type of removable output medium. Many times a vehicle operator requires data concerning all such trips and the system 10 provides a convenient method of writing such data on a suitable medium via the media writer device 32. Alternatively, the data from the route planning computer 12 concerning various trips taken by the vehicle could be transmitted to a remote location via the transmitter 22 and antenna 20. This possibility is indicated in FIG. 1 by the connection of the transmitter 22 to the in-vehicle route planning computer 12 and the possibility that switch 20A may connect the antenna 20 to the transmitter 22 for use thereby. Also, the transmitter 22 may be used by the computer 12 to send an acknowledgement back to a remote location indicating proper reception by the vehicle 11 of trip data from the remote location.

A key feature of the system 10 is that trip data is not necessarily entered into the in-vehicle route planning computer 12 by the vehicle operator utilizing the conventional computer input devices 15 and 16. Thus the system 10 contemplates a remote location at which the vehicle operator can specify his desired destination for a trip and any other type of trip preferences. Referring to FIG. 1, a location 40 indicated by dashed outline is shown as being remotely located from and external to the vehicle 11. At the location 40 there is provided a keyboard input device 41 and a microphone 42 so as to enable a person external to the vehicle 11 to specify input trip data such as a desired destination for a trip. Again, the microphone 42 is provided in case it is desired to utilize speech recognition circuitry to convert audible commands into electrical command signals. The data provided by the input devices 41 and 42 is received by a message encoder computer 43 which receives input signals and converts them into a suitable data format such that these signals can be received by the in-vehicle route planning computer 12. The message encoder computer 43 has an output connected to a radio transmitter 44 which is selectively connected to an antenna 45 which implements the wireless communication link 20B coupling it to the antenna 20. Alternatively, the encoder computer 43 also has an output connected to a media writer device 46 which can selectively write received trip information onto a floppy disk or tape such as the disk 30. Then, subsequently the vehicle operator will take such a disk and insert it into the media reader device 31 when he enters the vehicle and desires entering the previously designated trip information into the in-vehicle route planning computer 12.

FIG. 1 also illustrates that a visual CRT display device 47 may be connected to the encoder computer 43 along with a speaker 48 such that the vehicle operator, when he is encoding messages into the computer 43 may verify the correctness of his data entries before providing such trip information to the vehicle via either the radio transmitter 44 or the media writer device 46. In addition, a radio receiver 49 and an output device 50 are illustrated in FIG. 1 as being connected to the antenna 45. Thus, when the in-vehicle route planning computer 12 uses the transmitter 22 to transmit trip or route information to the remote location 40, the radio receiver 49 will receive this information and a hard copy of the information will be stored in and printed out by the output device 50 if such operation is selected for implementation. Also, the receiver 49 may provide an input to the computer 43 such that the route calculated by the computer 12 may be transmitted to the computer 43 via the radio link 20B. This route would then be displayed on the display device 47 thereby providing a remote readout at location 40 of the planned route calculated by the in-vehicle computer 12.

Figure 2:
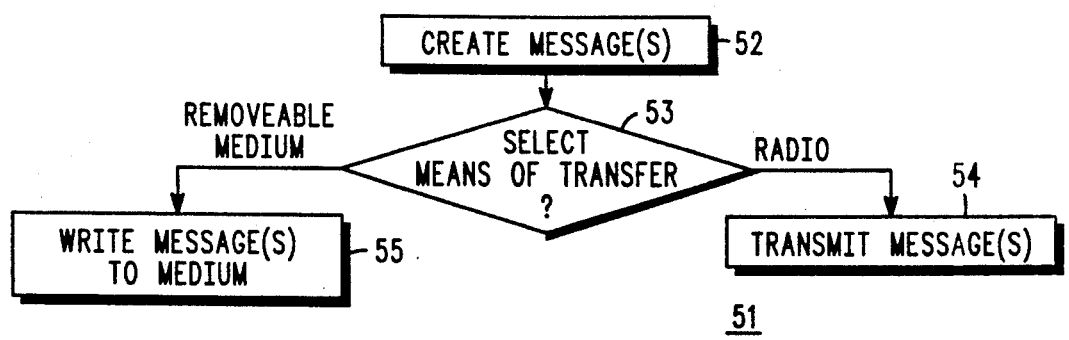
FIG. 2 is a flowchart representative of how the system in FIG. 1 creates trip data for a desired destination with the trip data being created external to the vehicle which has an in-vehicle route planning computer located therein.

Referring to FIG. 2, a brief flowchart 51 illustrating the external creation of trip data by a vehicle operator is illustrated. The flowchart 51 in FIG. 2 comprises a process block 52 indicative of the vehicle operator creating trip data, external to the vehicle 11, in the form of messages through the use of the input keyboard 41 or the microphone 42 and the encoder computer 43. The vehicle operator then selects, via a decision block 53, the manner of transferring this encoded trip data to the vehicle route planning computer 12. If the vehicle operator selects the use of the radio link 20B between the antennas 45 and 20, then a process block 54 transmits the trip data to the vehicle 11. The vehicle operator may also alternatively select the use of a removeable storage medium, and then a process block 55 results in the media writer device 46 writing the trip information on a removeable storage medium such as a floppy disk or a tape. In either event, the vehicle operator has designated, external to the vehicle, trip data for a proposed trip wherein this data has been reduced to electrical/magnetic signals external to the vehicle 11 and then such signals are provided to the in-vehicle route planning computer 12. In this manner the vehicle operator may create the trip data at his convenience at any remote location he desires rather than requiring the vehicle operator to directly enter trip data through use of the in-vehicle input devices 15 and 16 in the vehicle 11.

Figure 3:
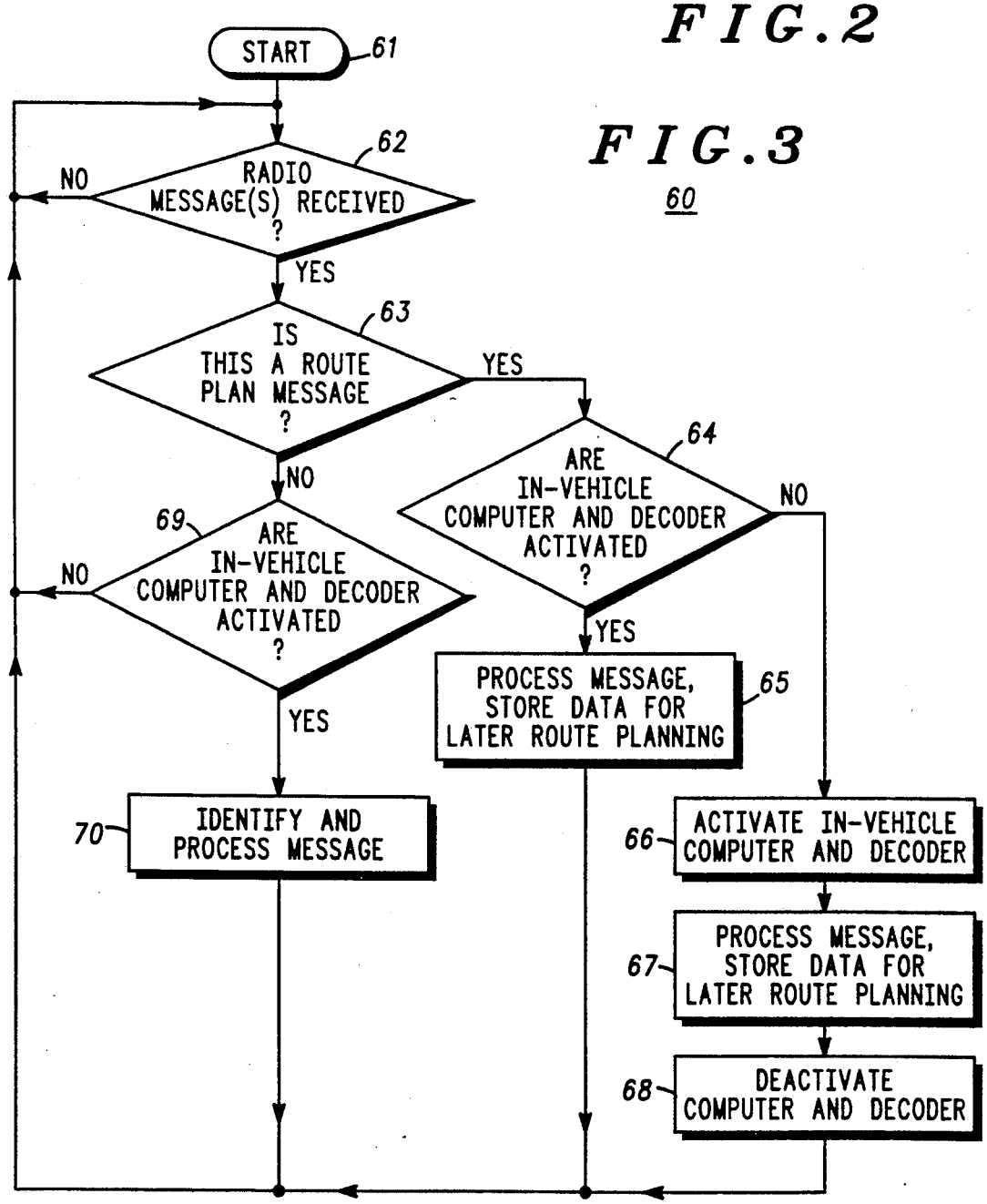
FIG. 3 is a flowchart which illustrates how in-vehicle electronics of the FIG. 1 system receives and responds to the externally created trip data.

Referring now to FIG. 3, a flowchart 60 is illustrated which designates how the apparatus in the vehicle 11 receives trip data when such data is transmitted via a wireless radio communication link to the antenna 20. A similar information flow also exists when such data is provided by the media reader device 31 rather than the antenna 20, but such an additional flowchart is not illustrated since it will substantially track the basic functions of the flowchart 60.

The flowchart 60 commences at a start terminal 61 and proceeds to a decision block 62 that determines if a radio message has been received by the standby receiver 21 and antenna 20. If not, control merely recirculates until such a message is received.

Upon reception of a radio message, control passes to a decision block 63 that inquires if the received message is a route planning message which specifies trip destination information that must be stored for later use by the route planning computer 12. This function is performed by the vehicle route plan message detector 23 which essentially just identifies if the received information is trip information or some other type of information that may be received for use by the in-vehicle route planning computer 12. Preferably, the in-vehicle route planning computer 12 will also periodically receive dynamic route information concerning the amount of traffic on local roads and the availability of various road ways in the area due to construction and/or accidents. Such dynamic route information is specified by persons other than the vehicle operator and will be used by the route planning computer 12 when determining an optimum route to a specified destination. Such information would be periodically generated by a traffic control center transmitter. This information would be received and stored by route planning computers which have the ability to receive such information and use it in their subsequent route planning. Thus the standby receiver 21 and antenna 20 may already be part of an existing in-vehicle dynamic route planning system and the transmission of trip data to the route planning computer 12 may just utilize these existing components which may be present in a prior system.

If the decision-block 63 determines that a route plan message having trip destination data has been received, control passes to a decision block 64 that inquires if the in-vehicle computer 12 and message decoder 25 are activated. If so, control passes to a process block 65 that processes the received route planning messages, and stores the trip data contained therein for a later route planning function to be requested by the vehicle operator after he enters the vehicle 11. Then control passes back to the terminal 61. If the in-vehicle computer 12 and message decoder 25 have not been activated as determined by the decision block 64, then control passes to a process block 66 which activates these devices by virtue of the activating signal produced at the terminal 24 in FIG. 1. Then control passes to a process block 67 which is substantially identical to the process block 65. Control then passes to a process block 68 which then deactivates the computer 12 and message decoder 25. From process block 68 control then passes back to the start terminal 61.

Essentially, the blocks 64 and 66 through 68 in FIG. 3 relate to turning on the route planning computer 12 and message decoder 25 if they are not already on whenever trip information is received such that these devices can process the trip information and the computer 12 can then store the information for later use. After the processing of this information these devices are then turned off to conserve energy. Of course when the vehicle operator enters the vehicle and turns on his computer system such as by turning on the ignition key of the vehicle 11, or turning on an on switch provided for the route planning apparatus in the vehicle 11, this will activate the message decoder 25 and computer 12 and these devices will remain activated until the vehicle operator turns them off.

Referring again to FIG. 3, if the decision block 63 determines that the received message is not a route planning message which contains trip data, then control passes from the block 63 to a block 69 which inquires if the in-vehicle computer 12 and message decoder 25 are already activated. If not, the received message is effectively ignored and control passes back again to the start terminal 61. If the decision block 69 determines that the vehicle computer 12 and decoder 25 are already activated, then control passes to a process block 70. The process block 70 first identifies what type of message information has been received since it already knows that this message is not a route planning message containing trip data. It then proceeds to process the identified message in accordance with some predetermined criteria. Thus, if the received message was merely dynamic route information specifying such things as the unavailability of a specific road due to an accident, then this information would be stored in the route planning computer memory and used by the computer 12 during any subsequent route planning implemented by the computer until this road unavailability data was erased by a subsequent received processed message or until the passage of a predetermined period of time. In other words, the process block 70 merely identifies what type of information is received and what should be done with this information with regard to the route planning computer 12. After the process block 70, the information flow then proceeds back to the start terminal 61.

From the above description of the present system 10, it is clear that the system provides a way of externally specifying trip data, including desired destination data, with regard to a desired trip for the vehicle 11. This trip data is translated into electrical signals which are then either radio transmitted to the vehicle 11 or stored on a removeable media device 30 which will subsequently be provided to the route planning apparatus contained in the vehicle 11. In either case, the vehicle operator is now able to specify at a remote location his desired trip data. Subsequently, this data may be advantageously loaded into the route planning apparatus contained in the vehicle 11 without the vehicle operator re-keying such information through the use of the in-vehicle input devices 15 and 16 provided in the vehicle 11. This has been accomplished without essentially duplicating the complex route planning software program contained within the route planning computer 12. Also duplicating the detailed road map data in the CD/ROM 14 at the remote location 40 is not necessary. This is because the message encoder computer 43 does not plan the route for the desired trip but merely converts the specified trip data into an information format which can be readily accepted by the in-vehicle route planning computer 12. Thus a vehicle operator may plan a trip in the comfort of his home or office and be spared the inconvenience of inputting a substantial amount of data into an in-vehicle computer by use of the in-vehicle input devices 15 and 16. However, the system 10 also retains the flexibility of allowing the vehicle operator to use the in-vehicle input devices 15 and 16 to specify any desired trip he wants to implement after he enters the vehicle 11. Many times the vehicle operator will determine his desired destination only after he has entered the vehicle 11, and therefore the system 10 will need the in-vehicle input devices 15 and 16 and the in-vehicle route planning computer 12.

While we have shown and described specific embodiments of the present invention, further modifications and improvements will occur to those skilled in the art. All such modifications which retain the basic underlying principles disclosed and claimed herein are within the scope of this invention.

What is claimed:

1. Vehicle route planning system, comprising:
route planning means located in a vehicle for receiving trip data, including at least one destination, and calculating at least one desired route for the vehicle to the destination via fixed road paths, and
means coupled to said route planning means for providing said trip data to said route planning means; wherein the improvement comprises said trip data providing means including data entry means located external to said vehicle for actuation by a person outside said vehicle, said data entry means, when actuated, receiving said trip data from said person and subsequently supplying said trip data to said route planning means, whereby said person can determine said trip data external to said vehicle and subsequently load said trip data into the route planning means.

2. Vehicle route planning system according to claim 1 wherein said trip data providing means includes a wireless communication link between said data entry means and said route planning means.

3. Vehicle route planning system according to claim 2 wherein said trip data providing means includes a radio transmitter and wherein said route planning means includes a radio receiver coupled to a route planning computer means.

4. Vehicle route planning system according to claim 3 wherein said radio receiver, in addition to coupling said trip data to said route planning computer means, also couples dynamic route information, other than information determined by said person, to said route planning computer means for use in planning said route to the destination.

5. Vehicle route planning system according to claim 4 wherein said radio receiver means includes circuitry for activating information storage means for storing received trip/route information in response to detecting the reception of such information by said radio receiver.

6. Vehicle route planning system according to claim 1 wherein said trip data providing means includes a reader means coupled to said route planning means for reading information stored on a carrier insertable into said reader means and wherein said data entry means includes means for storing said trip data on said carrier.

7. Vehicle route planning system according to claim 1 which includes a transmitter means attached to said vehicle, said transmitter means sending information signals to said data entry means for advising said person external to said vehicle as to reception of said trip data by said route planning means.

8. Vehicle route planning system according to claim 1 which includes route log means for providing information external to said vehicle concerning actual routes traveled by said vehicle.

9. Vehicle route planning system, comprising:
route planning means located in a vehicle for receiving trip data, including at least one destination, and calculating at least one desired route for the vehicle to the destination via fixed road paths, and
means coupled to said route planning means for providing said trip data to said route planning means; wherein the improvement comprises said trip data providing means including data entry means located external to said vehicle for actuation by a person outside said vehicle, said data entry means, when actuated, receiving said trip data from said person, encoding said trip data as electrical signals external to said vehicle and subsequently supplying said trip data to said route planning means, whereby said person can determine said trip data external to said vehicle and subsequently load said trip data into the route planning means.

10. Vehicle route planning system according to claim 9 wherein said trip data providing means includes a wireless communication link between said data entry means and said route planning means for coupling said electrical signals to said route planning means.

11. Vehicle route planning system according to claim 10 wherein said trip data providing means includes a radio transmitter and wherein said route planning means includes a radio receiver coupled to a route planning computer means.

12. Vehicle route planning system according to claim 11 wherein said radio receiver, in addition to coupling said trip data to said route planning computer means, also couples dynamic route information, other than information specified by said person, to said route planning computer means for use in planning said route to the destination.

13. Vehicle route planning system according to claim 11 wherein said radio receiver means includes circuitry for activating information storage means for storing received trip/route information in response to detecting the reception of such information by said radio receiver.

14. Vehicle route planning system according to claim 9 wherein said trip data providing means includes a reader means coupled to said route planning means for reading information stored on a carrier insertable into said reader means and wherein said data entry means includes means for storing said trip data on said carrier as stored magnetic/electrical signals.

15. Vehicle navigation system, comprising:
route planning means located in a vehicle for receiving trip data, including at least one destination, and calculating at least one desired route for the vehicle to the destination via fixed road paths, and
means coupled to said route planning means for providing said trip data to said route planning means; and
navigation means coupled to said route planning means for providing verbal/visual navigation instructions to a vehicle operator for implementing said calculated route for said vehicle;
wherein the improvement comprises said trip data providing means including data entry means located external to said vehicle for actuation by a person outside said vehicle, said data entry means, when actuated, receiving said trip data from said person, encoding said trip data as electrical signals external to said vehicle, and subsequently supplying said trip data to said route planning means, whereby said person can determine said trip data external to said vehicle and subsequently load said trip data into the route planning means.

16. Vehicle navigation system according to claim 15 wherein said trip data providing means includes a wireless communication link between said data entry means and said route planning means.

17. Vehicle navigation system according to claim 16 wherein said trip data providing means includes a radio transmitter and wherein said route planning means includes a radio receiver coupled to a route planning computer means.

18. Vehicle route planning system, comprising:
route planning means located in a vehicle for receiving trip data, including at least one destination, and calculating at least one desired route for the vehicle to the destination via fixed road paths, and
means coupled to said route planning means for providing said trip data to said route planning means;
wherein the improvement comprises said trip data providing means including trip data receiving means internal to said vehicle for receiving said trip data in the form of signals created external to said vehicle and subsequently supplying said trip data to said route planning means, whereby a person can create trip data signals external to said vehicle and subsequently load said trip data signals into the route planning means.

19. Vehicle route planning system according to claim 18 wherein said trip data receiving means includes a wireless communication receiver for receiving said trip data signals, and wherein said wireless receiver means includes circuitry for activating information storage means for storing said received trip data signals in response to detecting the reception of such signals by said wireless receiver means.

20. Vehicle route planning system according to claim 18 wherein said trip data receiving means includes a reader means coupled to said route planning means for reading information stored on a carrier insertable into said reader means.

* * * * *